(12) United States Patent
Cowperthwaite

(10) Patent No.: US 7,340,677 B2
(45) Date of Patent: Mar. 4, 2008

(54) METHODS AND APPARATUSES OF PRESENTING CATEGORICAL PROGRAMS IN PROGRESSIVE LEVELS OF CONTENT DETAILS

(75) Inventor: David J. Cowperthwaite, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 374 days.

(21) Appl. No.: 10/107,758

(22) Filed: Mar. 26, 2002

(65) Prior Publication Data

US 2003/0184578 A1  Oct. 2, 2003

(51) Int. Cl.
*G06F 3/00* (2006.01)

(52) U.S. Cl. .......................... 715/719; 725/40

(58) Field of Classification Search ............... 715/719, 715/720, 721, 788
See application file for complete search history.

(56) References Cited

U.S. PATENT DOCUMENTS

| | | | |
|---|---|---|---|
| 5,541,738 A | 7/1996 | Mankovitz | |
| 5,619,632 A | 4/1997 | Lamping et al. | |
| 5,630,119 A | 5/1997 | Aristides et al. | |
| 5,632,009 A | 5/1997 | Rao et al. | |
| 5,880,742 A | 3/1999 | Rao et al. | |
| 5,883,635 A | 3/1999 | Rao et al. | |
| 5,990,890 A * | 11/1999 | Etheredge | 715/808 |
| 6,020,880 A | 2/2000 | Naimpally | |
| 6,055,550 A * | 4/2000 | Wallack | 715/509 |
| 6,085,202 A | 7/2000 | Rao et al. | |
| 6,172,677 B1 * | 1/2001 | Stautner et al. | 715/716 |
| 6,230,170 B1 * | 5/2001 | Zellweger et al. | 715/512 |
| 6,661,468 B2 * | 12/2003 | Alten et al. | 348/569 |

OTHER PUBLICATIONS

Microsoft Excel 2000 (copyright 1985-1999).*
IDELIX Software, Inc., ExcelLens The Real-time Highlighter & Magnifier for Microsoft Excel, http://www.idelix.com/excellens.shtml, downloaded on Jun. 5, 2007, 1 page.
INXIGHT Software, Inc., Inxight TableLens—The fastest way to turn data into decisions, http://www.inxight.com/products/sdks/tl/, downloaded on Jun. 5, 2007, 2 pages.
Rao et al. "The Table Lens: Merging Graphical and Symbolic Representations in an Interactive Focus+Context Visualization for Tabular Information" Human Factors in Computing Systems CHI Apr. 24-28, 1994 Boston, MA, USA, pp. 318-482.

* cited by examiner

*Primary Examiner*—Sy D. Luu
*Assistant Examiner*—Thanh Vu
(74) *Attorney, Agent, or Firm*—Molly A. McCall

(57) ABSTRACT

Methods and apparatuses for presenting categorical programs. The method causes information of a plurality of programs fitting categories defined in a request to be retrieved from a database. The method then causes a first tabular layout to be generated. The first tabular layout comprises a first level of content details for each of the plurality of programs. The first tabular layout has a first total dimension. The method causes the first level of content details for a selected program to be adjusted to a second level of content details in response to an interaction by a user. The method then causes the spaces occupied by the plurality of programs to be resized according to the second level of content details. The method then causes a second tabular layout to be generated. The second tabular layout has a second dimension that is substantially the same as the first total dimension.

16 Claims, 10 Drawing Sheets

101

| | 8:00 PM | 8:30 PM | 9:00 PM | 9:30 PM | 10:00 PM | 10:30 PM | |
|---|---|---|---|---|---|---|---|
| 1 LEAC001 | Leased Access | | | | | | 1 LEAC001 |
| 2 TVGOS | TV Guide | | | | | | 2 TVGOS |
| 3 KWBP | Witchblade** (2000, Action / Ad) | | | | Blind Date | Elimidate | 3 KWBP |
| 4 KATU | My Wife & Kids | According to Jim | Drew Carey Show | Whose Line Is It Anyway? | NYPD Blue | | 4 KATU |
| 5 KPXG | Mysterious Ways | | Doc | | Diagnosis Murder | | 5 KPXG |
| 6 KOIN | JAG | | The Guardian | | Judging Amy | | 6 KOIN |
| 7 DISC | The New Detectives | | The New Detectives | | The FBI Files | | 7 DISC |
| 8 KGW | XIX Winter Olympics | | | | | | 8 KGW |
| 9 WGNSAT | In the Heat of the Night | | Matlock | | Street Smarts | Suddenly Susan | 9 WGNSAT |
| 10 KOPB | Nova | | American Masters | | | Ralph Ellison's | 10 KOPB |

| | 8:00 PM | 8:30 PM | 9:00 PM | 9:30 PM | 10:00 PM | 10:30 PM | |
|---|---|---|---|---|---|---|---|
| 11 PUAC011 | Public Access | | | | | | 11 PUAC011 |
| 12 KPTV | Buffy the Vampire Slayer | | Buffy the Vampire Slayer | | 10 O'Clock News | | 12 KPTV |
| 13 KPDX | That '70s Show | Undeclared | [24] | | Fox News at 10 | | 13 KPDX |
| 15 ADCH015 | Ad Channel | | | | | | 15 ADCH015 |
| 16 QVC | Suze Orman's Financial Freedom | | Eternagold | | Now You're Cooking | | 16 QVC |
| 17 HSN | Let's Cook! 3rd Anniversary | | Indian Desert Fest Jewelry | | | | 17 HSN |
| 18 HALMRK | Dr. Quinn, Medicine Woman | | Love Songs (1999, Drama) | | | | 18 HALMRK |
| 19 SHOPNBC | Computer Store | | Fashion | | Gem Event | | 19 SHOPNBC |
| 20 KNMT | Praise the Lord | | Religious Special | | Marilyn Hickey | Benny Hinn | 20 KNMT |
| 21 PUAC021 | Public Access | | | | | | 21 PUAC021 |

| | 8:00 PM | 8:30 PM | 9:00 PM | 9:30 PM | 10:00 PM | 10:30 PM | |

102 → details at Figure 2

| | 8:00 PM | 8:30 PM | 9:00 PM | 9:30 PM | 10:00 PM | 10:30 PM | |
|---|---|---|---|---|---|---|---|
| 1 LEAC001 | Leased Access | | | | | | 1 LEAC001 |
| 2 TVGOS | TV Guide | | | | | | 2 TVGOS |
| 3 KWBP | Witchblade** (2000, Action / Ad) | | | | Blind | Elimidate | 3 KWBP |
| 4 KATU | My Wife | According to | Drew | Whose | NYPD Blue | | 4 KATU |
| 5 KPXG | Mysterious Ways | | Doc | | Diagnosis Murder | | 5 KPXG |
| 6 KOIN | JAG | | The Guardian | | Judging Amy | | 6 KOIN |
| 7 DISC | The New Detectives | | The New Detectives | | The FBI Files | | 7 DISC |
| 8 KGW | XIX Winter Olympics | | | | | | 8 KGW |
| 9 WGNSAT | In the Heat of the Night | | Matlock | | Street | Suddenly | 9 WGNSAT |
| 10 KOPB | Nova | | American Masters | | | Ralph | 10 KOPB |
| | 8:00 PM | 8:30 PM | 9:00 PM | 9:30 PM | 10:00 PM | 10:30 PM | |
| 11 PUAC011 | Public Access | | | | | | 11 PUAC011 |
| 12 KPTV | Buffy the Vampire | | Buffy the Vampire | | 10 O'Clock News | | 12 KPTV |
| 13 KPDX | That | Undeclared | [24] | | Fox News at 10 | | 13 KPDX |
| 15 ADCH015 | Ad Channel | | | | | | 15 ADCH015 |
| 16 QVC | Suze Orman's Financial | | Eternagold | | Now You're Cooking | | 16 QVC |
| 17 HSN | Let's Cook! 3rd | | Indian Desert Fest Jewelry | | | | 17 HSN |
| 18 HALMRK | Dr. Quinn, Medicine | | Love Songs (1999, Drama) | | | | 18 HALMRK |
| 19 SHOPNBC | Computer Store | | Fashion | | Gem Event | | 19 SHOPNBC |
| 20 KNMT | Praise the Lord | | Religious Special | | Marilyn | Benny | 20 KNMT |
| 21 PUAC021 | Public Access | | | | | | 21 PUAC021 |
| | 8:00 PM | 8:30 PM | 9:00 PM | 9:30 PM | 10:00 PM | 10:30 PM | |

FIG. 3B

| | 8:00 PM | 8:30 PM | 9:00 PM | 9:30 PM | 10:00PM | 10:30PM | |
|---|---|---|---|---|---|---|---|
| 1 LEAC001 | Leased Access | | | | | | 1 LEAC001 |
| 2 TVGOS | TV Guide | | | | | | 2 TVGOS |
| 3 KWBP | Witchblade** (2000, Action / Ad) | | | | Blind | Elimidate | 3 KWBP |
| 4 KATU | My Wife | Accordi | Drew Carey | Whose Line Is | NYPD Blue | | 4 KATU |
| 5 KPXG | Mysterious Ways | | Doc | | Diagnosis Murder | | 5 KPXG |
| 6 KOIN | JAG | | The Guardian | | Judging Amy | | 6 KOIN |
| 7 DISC | The New Detectives | | The New Detectives | | The FBI Files | | 7 DISC |
| 8 KGW | XIX Winter Olympics | | | | | | 8 KGW |
| 9 WGNSAT | In the Heat of the | | Matlock | | Street | Suddenly | 9 WGNSAT |
| 10 KOPB | Nova | | American Masters | | | Ralph | 10 KOPB |
| | 8:00 PM | 8:30 PM | 9:00 PM | 9:30 PM | 10:00 | 10:30 | |
| 11 | Public Access | | | | | | 11 |
| 12 KPTV | Buffy the Vampire | | Buffy the Vampire Slayer | | 10 O'Clock News | | 12 KPTV |
| 13 KPDX | That '70s Show | Undecla red | [24]: [11:00AM - 12:00 Noon] [(Crime)] [TV14] [Events turn violent at the compound as Jack hones in on his family's location.] [CC] [Stereo] [] | | Fox News at 10 | | 13 KPDX |
| 15 | Ad Channel | | | | | | 15 |
| 16 QVC | Suze Orman's | | Eternagold | | Now You're Cooking | | 16 QVC |
| 17 HSN | Let's Cook! 3rd | | Indian Desert Fest Jewelry | | | | 17 HSN |
| 18 | Dr. Quinn, Medicine | | Love Songs (1999, Drama) | | | | 18 |
| 19 | Computer Store | | Fashion | | Gem Event | | 19 |
| 20 KNMT | Praise the Lord | | Religious Special | | Marilyn | Benny | 20 KNMT |
| 21 | Public Access | | | | | | 21 |

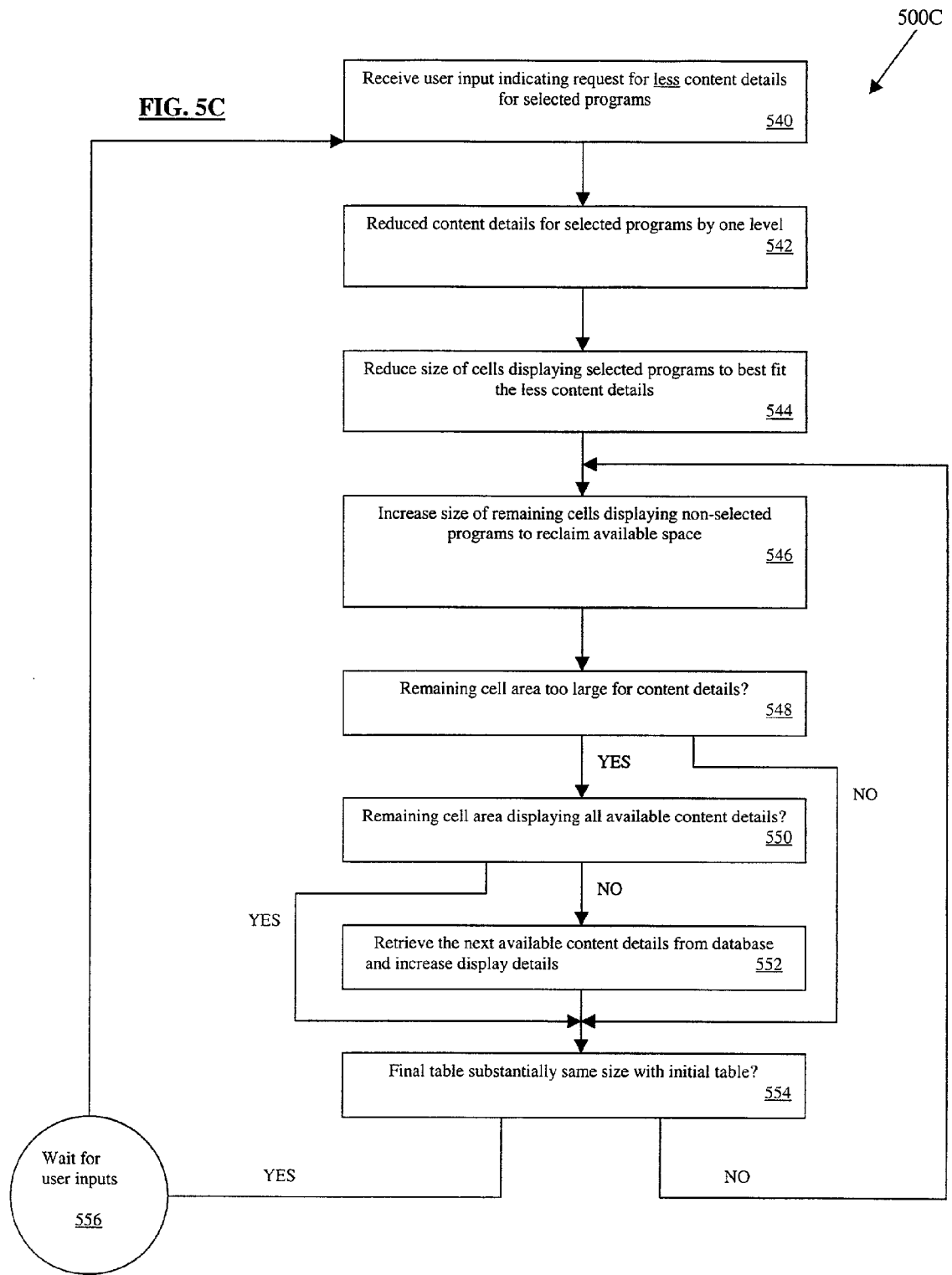

METHODS AND APPARATUSES OF PRESENTING CATEGORICAL PROGRAMS IN PROGRESSIVE LEVELS OF CONTENT DETAILS

FIELD

The embodiments of the invention relate generally to the field of electronic program guide and, more specifically, to presenting categorical programs having progressive levels of content details with the use of a detail in context presentation method.

BACKGROUND

Electronic program guide (EPG) is an interactive presentation tool using an electronic device such as a computer to present information to users. For example, for television, EPG is an interactive toll that allows users to view the complete list of the TV channels and radio stations, to have the grids of programs of the channels over a certain amount of hours, and to select the programs according to the channel and the schedules to view more details about the selected programs. The traditional EPG for television displays listing of the most general information about the programs, for example, listing the title, time and channel of the shows.

Often users are interested in learning of more detail of a particular show or shows than the information initially listed. Under the current art, to enable the users to view more details for the particular show, the particular EPG product has a feature that lets the users select the particular show and the EPG opens a separate viewing page that presents more detail information for this particular show. See for example U.S. Pat. Nos. 6,020,880 and 5,541,738. The current EPG products for television involve changing viewing context between an initial program lineup and a detailed presentation of the information regarding a specific show. See for example U.S. Pat. No. 6,020,880.

Under the current art, the detailed information is presented on a different page. The current art thus involves multiple views (or web pages in cases where the EPG is run from a web browser) and requires the user to switch back and forth between the program listings and the program information. The switching back and forth between the program listings and the program detailed information forces the user to mentally track the relationship of the current page or show to the rest of the programming schedule while in the detail view. Transitions between the details and overview presentation of the traditional EPG presentations are discontinuous and incur a greater mental effort to track the relationship between the two states. The traditional EPG presentation also does not facilitate simultaneous viewing of more than one detailed program view.

There is thus a desire for viewing for categorical information such as television show listings that does not require switch back and forth from the program listings page to the detailed information pages of particular selected programs.

BRIEF DESCRIPTION OF THE DRAWINGS

The invention will be understood more fully from the detailed description given below and from the accompanying drawings of various embodiments of the invention, which, however, should not be taken to limit the invention to the specific embodiments, but are for explanation and understanding only. In the drawings:

FIG. 1 illustrates an exemplary program listing information of an electronic program guide for television programs;

FIG. 3A illustrates an exemplary electronic program guide that can be used in the exemplary embodiments in the detailed descriptions;

FIG. 3B illustrates an exemplary electronic program guide having selected programs containing more content details;

FIG. 5C illustrates an exemplary method of presenting categorical programs having progressive levels of details in an electronic program guide in which less content details are requested for selected programs;

DETAILED DESCRIPTION

Figure 2:
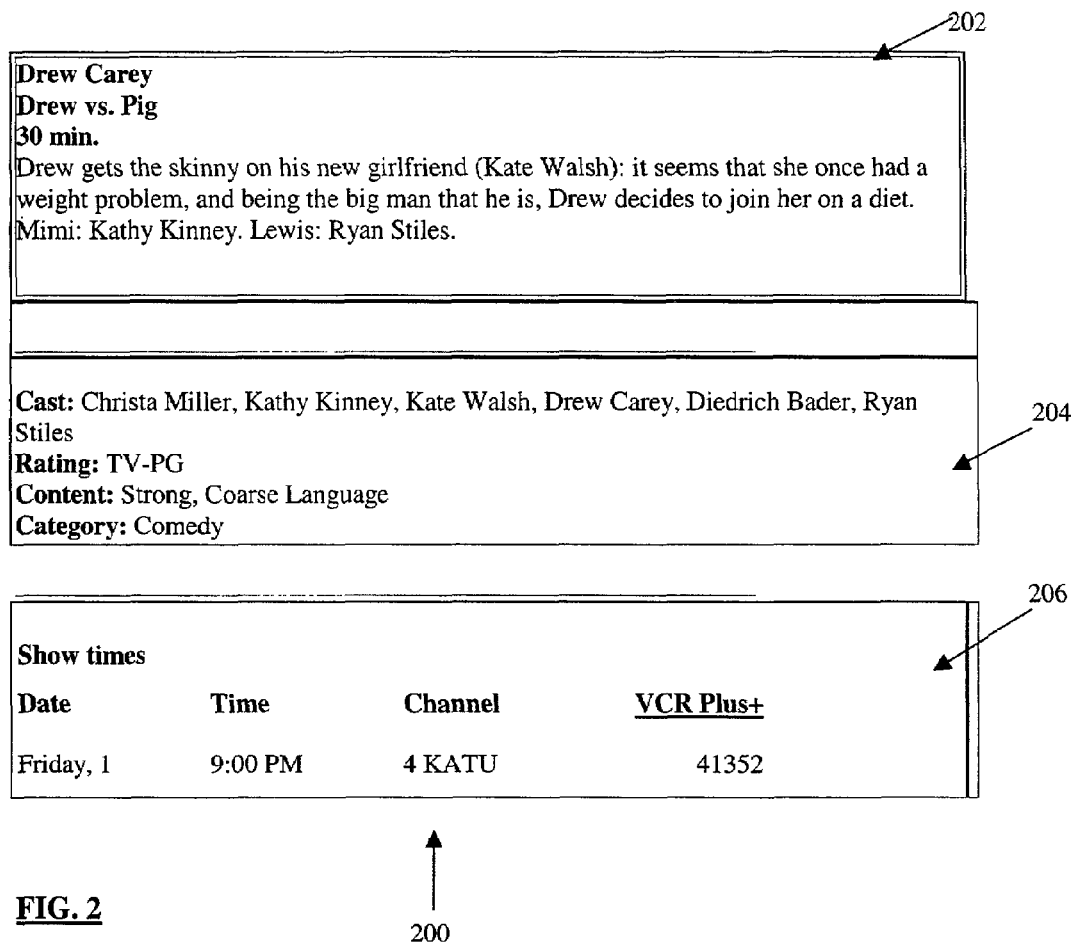
FIG. 2 illustrates an exemplary separate detail information page of a program selected from the program listing information of the electronic program guide shown in FIG. 1.

In the following description, numerous specific details are set forth. However, it is understood that embodiments of the invention may be practiced without these specific details. In other instances, structures and techniques have not been shown in detail in order not to obscure the understanding of this description.

In the embodiments below, categorical programs having progressive levels of content details are presented in a program-listing page such as an electronic program guide. The embodiments below relate to method of presenting the categorical programs without requiring switching back and forth from the program-listing page to detailed information pages to view more content details of selected programs. The program-listing page begins with an initial layout of a low-detail view of the schedules of the programs. The initial layout gives an overview presentation of programs fitting a defined set of parameters such as time and location. The initial layout enables users to indicate (e.g., through making a selection with a mouse click) interest in a selected program or programs. The interest may involve requesting for more detailed information or for less detailed information of the selected program(s). The indication by the user results in a reorganization of the initial layout to provide a more detailed view or a less detailed view of the information corresponding to the selected program(s). The amount of space occupied by the non-selected programs is changed accordingly. The change may provide the space necessary to accommodate the increase information in the selected program. Alternatively, the change may provide the reduced space for selected programs that requires less detail, and may free up space for the non-selected programs. The presentation of the categorical programs having progressive levels of details according to the exemplary embodiments below does not require loading of a new information page in addition to the initial layout page.

The embodiments of the invention also relates to apparatus (e.g. an application routine or device having an application routine) for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The routines presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the exemplary embodiments below are not described with reference to any particular programming language. It will be appreciated that a variety of programming languages may be used to implement the embodiments as described herein.

Categorical programs having progressive levels of details includes programs or events fitting under various categories and parameters. These programs or events can be categorized under categories such as time, date, and location for the event. These programs or events are often arranged into a schedule-like format that displays some level of details for each program. Examples of categorical programs includes, but are not limited to, television program schedules, conference schedules, class schedules, class catalogue, presentation schedules, festival schedules, movies schedules, advertisement schedules, advertisement listings, financial reports, sport program schedules, activity schedules, publication schedules, and etc. The categorical programs are stored in a database that comprises the different levels of details for each program. The details can be arranged in a progressive levels ranging from the lowest content detail level containing the least detailed information to the highest content detail level containing the most detailed information for each program.

The database and the application routine may be stored in a machine-readable medium or a computer readable storage medium, such as, but is not limited to, any type of disk including floppy disks, optical disks, CD-ROMs, magnetic disk storage media, optical storage media, magnetic-optical disks, read-only memories (ROMs), random access memories (RAMs), EPROMs, EEPROMs, magnetic or optical cards, flash memory devices; electrical, optical, acoustical or other form of propagated signals (e.g., carrier waves, infrared signals, digital signals, etc.) or any type of media suitable for storing electronic instructions and thee databases. The medium is coupled to a computer system bus.

In FIG. 1, table 100 lists the title of the shows played during the hours from 8:00 pm to 10:30 pm (row 102) on channels listed in the column 101. For instance, on channel 12 KPTV, Buffy the Vampire show is playing from 8:00 pm to 9:00 pm, another Buffy the Vampire show is playing from 9:00 pm to 10:00 pm, and 10 O'Clock News is on from 10:00 pm to 10:30 pm.

In a typical case, to view more detailed information for a specific show, a separate page is required. In one specific instance, FIG. 2 illustrates detailed information table 200 of the Drew Carey show at 9:00 pm on channel 4 KATU. To get to the table 200, the user selects the Drew Carey show at 9:00 pm on channel 4 KATU from the table 100 by for example, a simple mouse click on a computer system. The selection by the user triggers the opening of the table 200 shown in FIG. 2. In box 202, the detailed information table 200 lists the title of the show, the name of the episode, the run time of the episode, the names of the characters played in the episode, and a brief summary or description of the episode. In box 204, the detailed information table 200 lists other details such as rating (e.g., Parental Guide, PG), names of the cast, brief description of content type (e.g., strong language), and type of show (e.g., comedy). In box 206, the detailed information table 200 re-lists the general information of the episode (e.g., show date, time, and channel).

FIG. 3A illustrates an exemplary electronic program guide for television shows, a table 300A in which detail viewing of a specific program does not required opening of a different page. It will be appreciated that the electronic program guide shown in FIG. 3A can be used to present other types of categorical programs such as conference schedules, etc. The electronic program guide for television programs is one example of a categorical program having progressive levels of details that can be used with the present embodiment. In this figure, television programs on 20 different channels at various time slots are presented. The programs are arranged in a spreadsheet format using any conventional spreadsheet method, for example, an Excel spreadsheet, a Lotus spreadsheet, or a Hypertext Mark Up Language (HTML) spreadsheet well known in the art. The table 300A comprises of row 301 to row 323 and column 330 to column 338 listing the categories (e.g., time and channel) and the specific programs (e.g., Buffy the Vampire and Drew Carey) fitting under those categories. In one example, the row 301 lists the program times, for example, 8:00 pm, 8:30 pm, 9:00 pm. 9:30 pm. 10:00 pm, and 10:30 pm. The column 330 lists the channels (e.g., 1 LEAC001, and 2 TVGOS) for the table 300A. In another embodiment, the rows 301, 312, and 323 and the column 330 define the categories or the parameters for the table 300A. The television programs fitting under these categories and these parameters are listed in the table 300A as shown in FIG. 3A. Various types of information about the programs are listed in the table 300A at various levels of details. For each program, the lowest level of detail information includes at least the name of the program.

FIG. 3B illustrates an exemplary embodiment in which the table 300 is reorganized to show more detailed information for a specific television program, for example, for the television program called "24". In this figure, a user has indicated from FIG. 3A above that more information on the show "24" is desired. As the user indication is accepted, the table 300A shown in FIG. 3A is reorganized to present the information shown in the table 300B of FIG. 3B. As shown in FIG. 3B, the television program "24" has been expanded to include more details such as the program's episode title, (e.g., [11:00 am to 12:00 noon]), the program type (e.g., "crime") and the brief program summary (e.g., events turn violent at the compound as Jack hones in on his family's location). FIG. 3B illustrates further that the row 315, which is the row displaying the television program "24" in this example, has been increased to accommodate the more detailed information for the program "24." Moreover, the remaining rows have been decreased to allow for the expansion of the row 315 without changing the total dimension of the table 300B. The rows are thus resized according to the details of the specific television program. It can be seen from FIG. 3A and FIGS. 3B that the dimensions for the table 300A and the table 300B are substantially similar. For example, the table 300A and the table 300B both have the same width 366 and the length 362 of the table 300A is substantially the same as the length 364 of the table 300B. Maintaining similar dimension between the table 300A and the 300B ensures that the user does not need to go to a different page to view more detailed information of the selected program(s).

Figure 4:
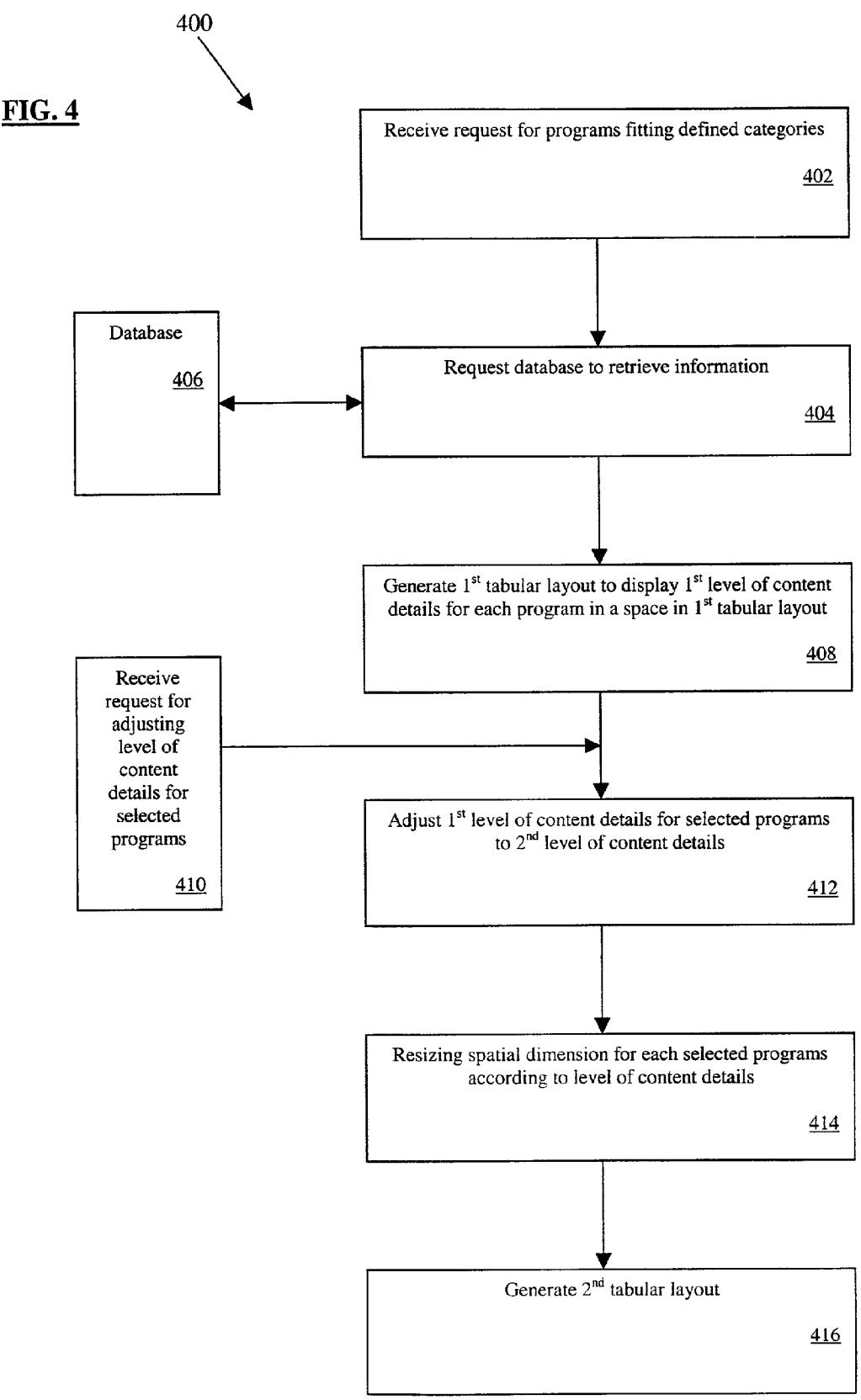
FIG. 4 illustrates an exemplary method of presenting categorical programs in an electronic program guide having progressive levels of details.

FIG. 4 illustrates an exemplary method 400 of presenting categorical programs having progressive levels of details. The method 400 discussed below can be used to reorganize the programs listed in the table 300A and the table 300B above. An apparatus such as a set of instructions, an application routine, a set of source codes, or software can be created to perform functions necessary for the method 400. In one embodiment, at box 402, an application routine receives requests from a user for programs fitting a defined set of categories. The categories are parameters that the user selects for the request. For example, the user may select categories such "time" and "location." As illustrated in FIG. 3A, the user may select "time" and "channel" as a category and set the range of hours and channels as parameters from 8:00 pm to 10:30 pm on various channels listed in column 330. The request thus defines the categories and parameters for what programs to be gathered. At box 404, the application routine generates a query or request to the database 406 to retrieve the appropriate information. The request to the database 406 also specifies the categories and parameters necessary to retrieve the correct programs fitting the set of categories and parameters defined by the user.

At box 408, once the correct programs information have been retrieved, the application routine generates an initial tabular layout (a first tabular layout) to display the first level of content details for each program fitting under the categories defined by the user. In one example, the first level of content details comprises the lowest detail view of the program information. Each of the programs occupies a space (a cell) in the initial tabular layout. In one example, all of the cells initially have about the same level of content details, typically, the lowest level of details such as those comprising the name of the programs.

At box 410, the application routine receives a request from the user to adjust the level of content details for a selected group of programs. The selected group of program may include anywhere from one single program to several programs. The user may send the request by inputting a selection or making an indication of the user's selection. In one example, the user uses a mouse click to make the selection and the request. Other input methods can be used, for instance, a computer system with a device having a touch screen feature will allow the user to the touch a monitor screen to make the selection and the request. Alternatively, a keyboard command can also be used.

At box 412, the application routine adjusts the first level of content details to a second level of content details. In one example, the first level of content details includes general information about the program such as the name of the program and the title of the episode of that program at a specific channel and time. The second level of content details may include more information than the general information about the program. For example, the second level of content details includes the type of the episode, the summary of the episode and other necessary information. Alternatively, the second level of content details may include less information than the general information about the program displayed in the first level of content details. In this example, the second level of content details includes just the name of the program. The details are presented in a progressive manner. For example, the user may request for more detailed information or less detailed information than the previous level which is not necessary the first level of content details generated in the initial tabular layout. As the number of the requests progresses, the level of the details also progresses to the level containing the most detailed information about a specific program. Alternatively, the level of details may progress in less and less information directed all the way down to the lowest level of detailed information, typically, the name of the program. Detailed information directs to any possible information available for a specific program or event. The possible information may be as detailed as a full summary of the program or may be as general as a name of the program.

At box 414, the spatial dimension of the cells in the initial tabular layout is resized for each of the group of selected programs according to the level of content details. In the example where the second level of content details involves more information than the first level of content details, the cells may be increased to accommodate more information. In the example where the second level of content details involves less information than the first level of content details, the cells may be decreased to best fit the information thus freeing up space for other cells. The spaces occupied by the programs are thus resized according to the second level of content details.

At box 416, the application routine generates a second tabular layout. In one example, the second tabular layout has the exact same dimension as the first tabular layout. In another example, the first tabular layout has a dimension that is substantially similar to the first tabular dimension. The substantial similarity in the dimension is such that the second tabular table occupies the same page or space as the first tabular table.

Figure 5A:
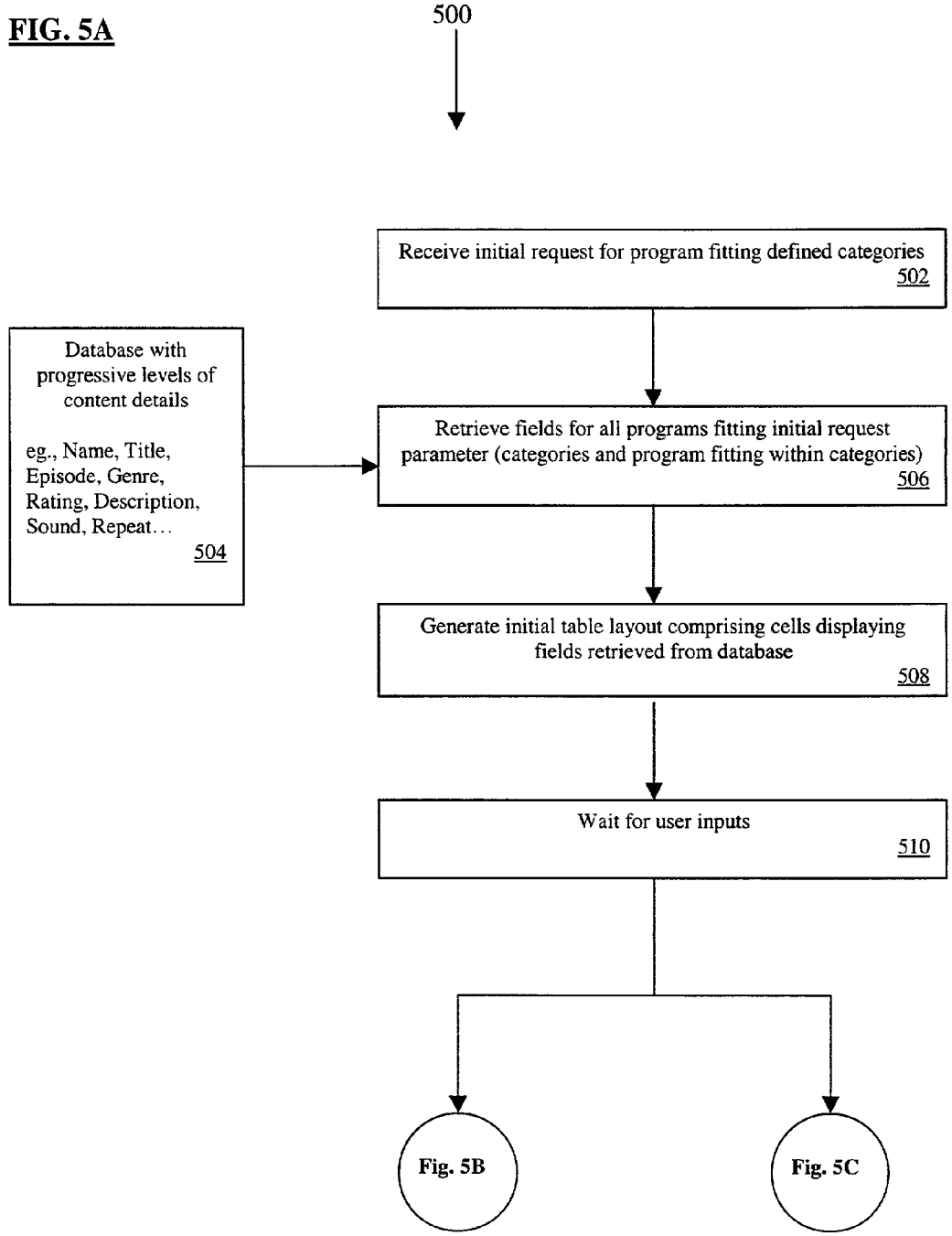
FIG. 5A illustrates another exemplary method of presenting categorical programs having progressive levels of details in an electronic program guide.
Figure 5B:
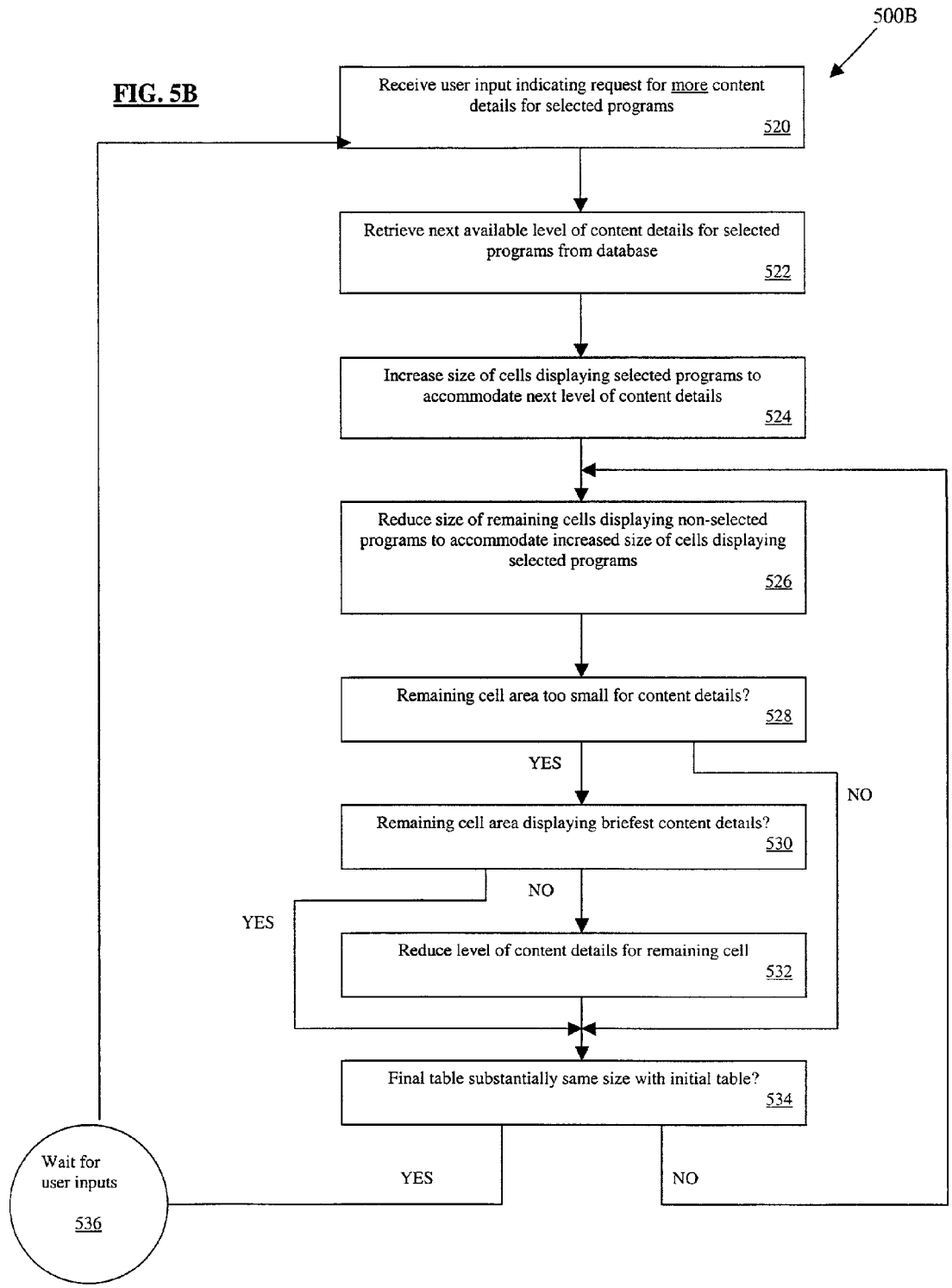
FIG. 5B illustrates an exemplary method of presenting categorical programs having progressive levels of details in an electronic program guide in which more content details are requested for selected programs.

FIGS. 5A to 5C illustrates another exemplary method, method 500, of presenting categorical programs having progressive levels of details. The method 500 discussed below can be used to reorganize the programs listed in the table 300A and the table 300B above. An apparatus such as a set of instructions, an application routine, a set of source codes, or software can be written to perform functions necessary for the method 500. At box 502, an application routine receives requests from a user for programs fitting a defined set of categories. The categories also accompany parameters that the user selects for categories within the request. For example, the user may select categories such "time" and "location." And, the user may set parameters such as range of hours and channels for the time and location categories, respectively. As illustrated in FIG. 3A, the user may select times from 8:00 pm to 10:30 pm on various channels listed in column 330. The request thus defines the categories and parameters for the programs to be gathered. At box 506, the application routine generates a query or request to the database 504 to retrieve the appropriate fields for all of the programs fitting the request from the user. The request to the database 504 also specifies the parameters necessary to retrieve the correct programs fitting the set of categories defined by the user. The database 504 comprises progressive detailed information for programs of many different categories such as names of the programs, titles of the programs episodes, types of the programs, ratings of the program, description of the programs, and etc . . . The database 504 can be set up for any particular categorical program such as televisions shows, meeting schedules, presentation events, and etc.

At box 508, once the correct programs information have been retrieved, the application routine generates an initial tabular layout (a first tabular layout) to display the fields fitting the defined categories and parameters that are retrieved from the database 504. The initial tabular layout displays a first level of content details for each program fitting under the categories and parameters defined by the user. Each of the programs occupies a space (a cell) in the initial tabular layout. In one example, all of the cells initially have about the same level of content details, typically, the lowest level of details such as those comprising just the name of the program.

At box 510, the application routine waits for the user inputs which will determine whether the method 500 proceed according to the paths in FIG. 5B or FIG. 5C.

FIG. 5B illustrates an exemplary path 500B in which the user has indicated desire for more content details in selected programs. At box 520, the application routine receives the user input, in essence, a request from the user that more information for the selected program is desired. The selected program may be anywhere from one single program or several programs. The user may send the request by inputting a selection or making an indication of the user's selection. In one example, the user uses a mouse click to make the selection and the request. Other input methods can be used, for instance, a computer system with a device having a touch screen feature will allow the user to the touch a monitor screen to make the selection and the request. Alternatively, a keyboard command can also be used.

At box 522, the application routine retrieves the next level of content details for the selected program. This next level of content details includes more information than the first information displayed in the first tabular layout.

At box 524, the spatial dimension of the cells of the selected program(s) in the initial tabular layout is increased to accommodate all of the new information in the next level of content details.

At box 526, the spatial dimension of the cells of the non-selected programs (e.g., the remaining programs for which the user indicated no interest) is reduced to accommodate for the increased in the spatial dimension for the cells of the selected program(s). At box 528, the application routine may determine whether the spatial dimension of the cells of the non-selected programs is too small for the content details in these cells. At this point, the application routine compares the available display space of the cell and the space that is currently used by the displayed the content details of the cell. If the answer to box 528 is "yes," the application routine may continue to assess whether the cells of the non-selected program are displaying the briefest content information possible as shown in box 530. If the answer to box 528 is "no," the application routine may skip down to box 534 in which the routine determines whether the final tabular layout is substantially the same in dimension (size) as the initial tabular layout.

At box 530 when the application routine assesses whether the cells of the non-selected program are displaying the briefest content information possible, if the answer to box 530 is "no," the routine reduces the level of content details of the non-selected programs. In one example, the content details are reduced to the briefest or the lowest content detail level. In another example, the content details are reduced to the level such the information displayed is not truncated. If the answer to box 530 is "yes," the application routine may skip down to box 534 in which the routine determines whether the final tabular layout is substantially the same in dimension (size) as the initial tabular layout. If the answer to box 534 is "no," the application routine may loop back to box 524 and repeat the method there. And if the answer to box 534 is "yes," the routine continues to box 536 in which it waits for the user inputs. The path 500B may loop back and repeat itself several times until the desired result is achieved. The methods from boxes 525 to 534 illustrate that the spaces for the programs can be resized according to the content detail level of the selected program(s).

FIG. 5C illustrates an exemplary path 500C in which the user has indicated desire for more content details in selected programs. At box 540, the routine receives the user input, in essence, a request from the user that less information for the selected program is desired. The selected program may be anywhere from one single program or several programs. The user may send the request by inputting a selection or making an indication of the user's selection. In one example, the user uses a mouse click to make the selection and the request. Other input methods can be used, for instance, a computer system with a device having a touch screen feature will allow the user to the touch a monitor screen to make the selection and the request. Alternatively, a keyboard command can also be used.

At box 542, the application routine removes the information down to the next lower level of content details for the selected program. This next lower level of content details includes less information than the first information displayed in the initial tabular layout.

At box 544, the spatial dimension of the cells of the selected program(s) in the initial tabular layout is reduced to best fit the less detailed contents. The reduction also frees up space for the remaining cells (e.g., the remaining programs for which the user indicated no interest) which may have more content details than the selected program(s). The remaining cells are sometimes referred to as the non-selected program in this discussion.

At box 546, the spatial dimensions of the cells, which display the non-selected programs are increased to reclaim the available space freed up by the reduction of the selected programs. At box 548, the application routine may determine whether the spatial dimension of the cells of the non-selected programs is too large for the content details in these cells. At this point, the application routine compares the available display space of the cell and the space that is currently used by the displayed the content details of the cell. If the answer to box 548 is "yes," the application routine may continue to assess whether the cells of the non-selected programs are displaying all the possible content information of the non-selected programs as shown in box 550. If the answer to box 528 is "no," the application routine may skip down to box 554 in which the routine determines whether the final tabular layout (second tabular layout) is substantially the same in dimension (size) as the initial tabular layout.

At box 550 when the application routine assesses whether the cells of the non-selected program are displaying all the possible content details for the non-selected programs, if the answer to box 530 is "no," the application routine moves to box 552 in which the routine increases the level of content details of the non-selected programs by retrieving more information from the database 504. In one example, if the cell has more display space available that is currently used and that space is sufficient to display another level of content details, the application routine makes a query to the database to retrieve the next level of content details. In this example, the content details are increased to the next detail level with more information being displayed. In another example, the content details are increased to the level such the information displayed is not truncated. In another example, if the information in the next level of detail is a field that can be characterized as 'short' (a single or a few words less than 4) then the information is added to the displayed information in the cell. If the information in the next level of detail is a field that is characterized as 'long" (a sentence or sentences) then the information is added to the cell but the information is truncated to fit in the available space. The truncation may be indicated by the presence of an ellipsis ( . . . ).

If the answer to box 550 is "yes," the application routine may skip down to box 554 in which the routine determines whether the final tabular layout is substantially the same in dimension (size) as the initial tabular layout. If the answer to box 554 is "no," the application routine may loop back to box 544 and repeat the method there. And if the answer to box 554 is "yes," the application routine continues to box 556 in which it waits for the user inputs. The path 500B may loop back and repeat itself several times until the desired result is achieved. The boxes 546 to 554 illustrate that the spaces for the programs can be resized according to the content detail level of the selected program(s).

In another method, which is substantially similar in all aspects to the method 500 discussed above, all cells of the final tabular layout are constrained to have at least some minimal dimension. For example, the minimal dimension must fit at least the name of the programs. The minimal dimension constraint leads limitations as to the maximum size and maximum number of magnified cells of the selected programs. In this method, a system may be implemented in such a manner that only the latest few (n) cells of interest (the selected programs) remain of interest in the computation of a new layout. Once the n+1$^{th}$ cell is selected the least-recently selected cell is "released" via an automatic signal generated by the routine rather than the user. When a cell is released, the information displayed in the cell is reduced to the lowest level of content details. In this example, the least-recently selected cell is reduced to contain the least content details.

In yet another method, the routine may grow the selected cell or selected cells continuously while the signal (or user selection) is present (e.g., when the user clicks and holds the mouse device). The application routine may also retrieve and add new information to the contents of the cells gradually as the available space in the tabular increases. Alternatively, the application routine may increase or decrease the size of the selected cells in steps (repeated clicks) in response to a series of signals from the user, where each indication leads to the retrieval of the next level of information from the database and the next increase in cell size computed by the system to accommodate the addition of this new information to the displayed contents of the selected cells.

Figure 6A:
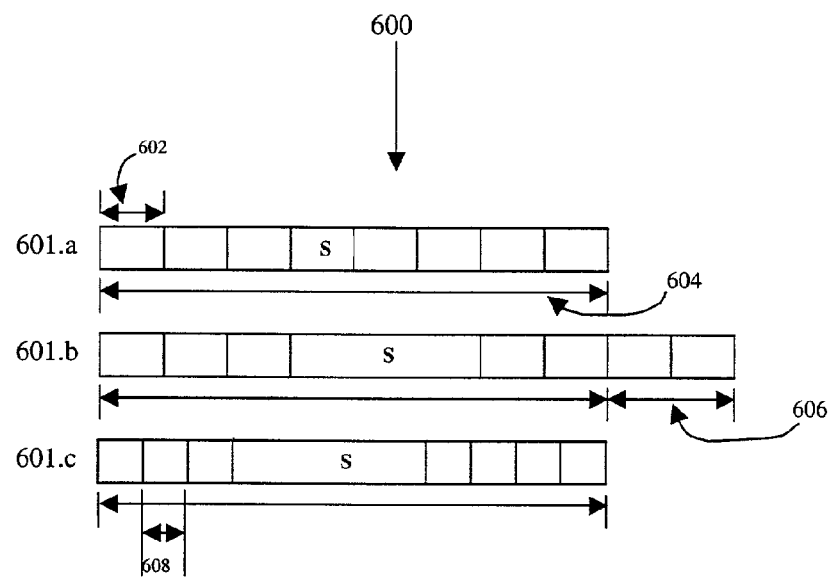
FIGS. 6A and 6B illustrate an exemplary method of performing a detail-in-context technique which can be used with some exemplary embodiments to present categorized program having progressive levels of details.

FIG. 6A illustrates an exemplary method 600 of resizing the cells of the tabular layout to present more information without needing to open a separate page. In this figure, the diagrams 601.a, 601.b, and 601.c indicate an exemplary process of adjusting the table layout to accommodate the increase in the size of a single cell. Note that the process is illustrated in one dimension only but can be scaled to two dimensions by repeating the computations to determine the new distribution of heights. The total width of the table is width 604, which is the sum of the individual cell widths (each of which is initially the same value width 602, in which each has some value, say 1 for this example). For example, if there are 8 cells and each is 1 unit, then the total width 604 is 8. Once a specific cell ("S") is made larger (see 601.b) to accommodate for the increase in the content details as discussed above, (for example 3 units wider or 3× wider the original width 602) then the total width of the table is the width 604 plus the new expansion 606. To resize the table back to the original total width 604, the remaining cells not selected is reduced (see 601.c). In the example above, if the selected cell "S" has been increased to 3 units, then an available space of 5 units is left to be distributed over the 7 remaining cells. Each of the remaining cells is resized (reduced) to 5/7 of the initial width 602, width 608.

Figure 6B:
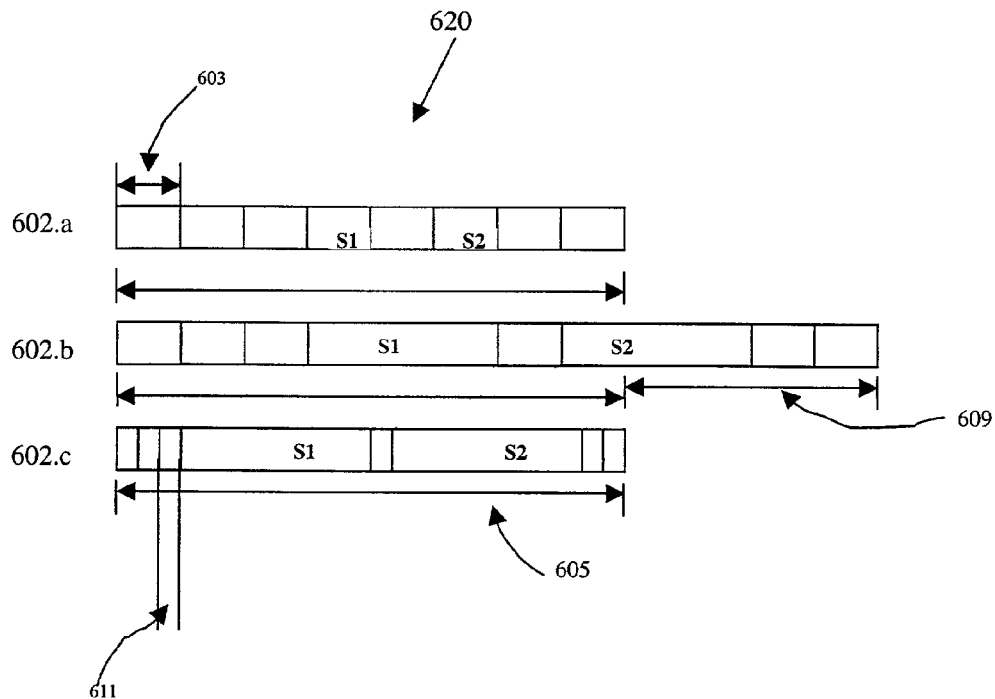

FIG. 6B illustrates another exemplary method 620 of resizing the cells of the tabular layout to present more information without needing to open a separate page. In this figure, the diagrams 602.a, 602.b, and 602.c indicate an exemplary process of adjusting the table layout to accommodate the increase in the size of two cells. Note that the process is illustrated in one dimension only but can be scaled to two dimensions by repeating the computations to determine the new distribution of heights. The total width of the table is width 605, which is the sum of the individual cell widths (each of which is initially the same value width 603, in which each has some value, 1 for this example). For example, if there are 8 cells then the total width 605 is 8. Two specific cells ("S1" and "S2") are made wider (see 602.b) to accommodate for the increase in the content details as discussed above, (say 3 units wide or 3× wider than the width 603) then the total width of the table is the width 605 plus the new expansion 609. To resize the table back to the original total width 605, the remaining cells not selected is reduced (see 602.c). In the example where the selected cells "S1" and "S2" each has been increased to 3 units, an available space of 2 units is left to be distributed over the 6 remaining cells. Each of the remaining cells is resized (reduced) to ⅓ of the initial width 603, width 611.

Figure 7:
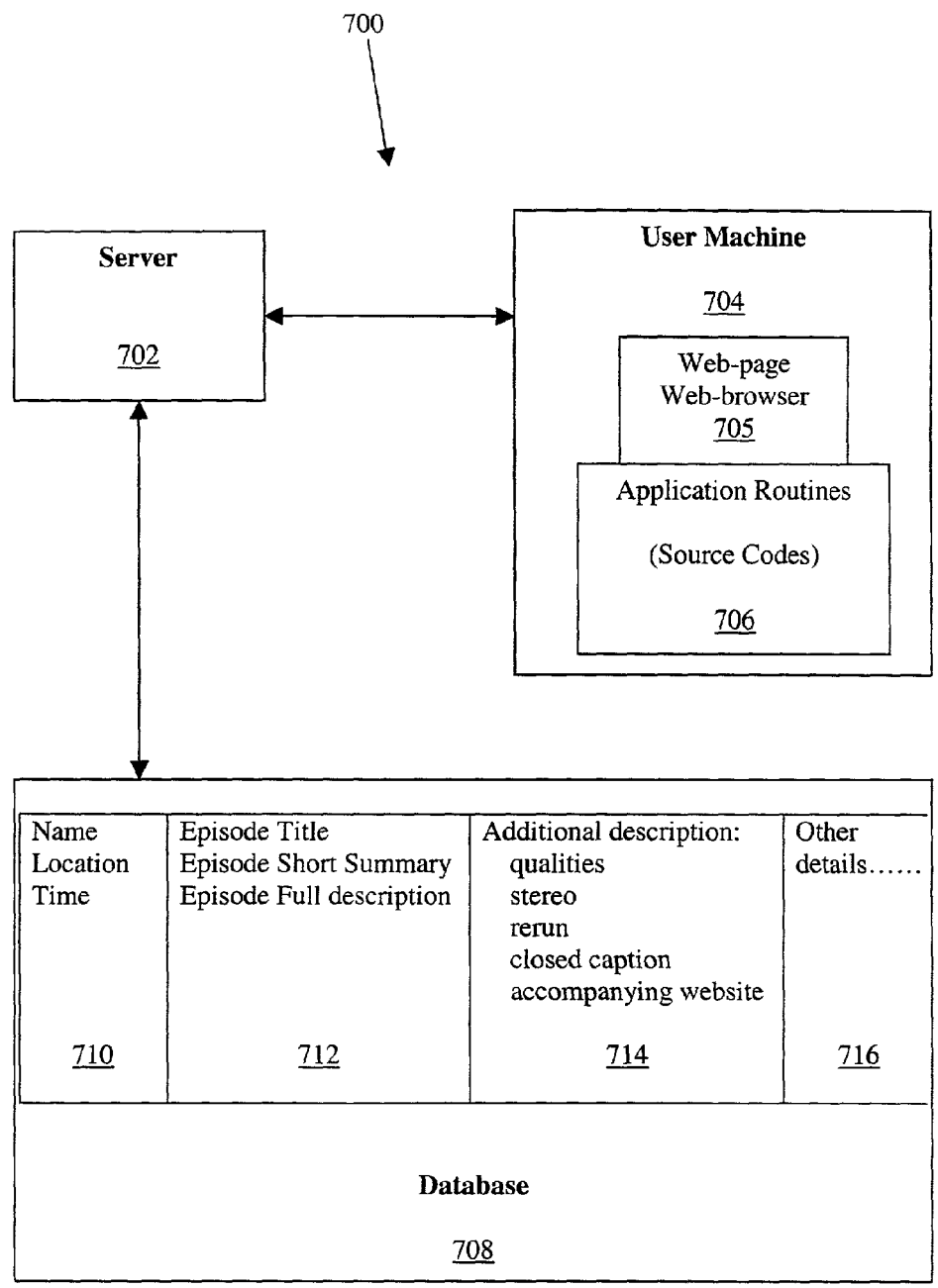
FIG. 7 illustrates an exemplary system 700 that can be set up with processes that can perform the embodiments described in this discussion.

FIG. 7 illustrates an exemplary system 700 that can be set up with processes that can perform the embodiments described in this discussion. In this example, the system 700 includes a server 702, a database 706, and a user machine 704. The server 702 is connected to the database 708 having a repository schedule and programming information for television shows. It is to be appreciated that the system 700 can be adapted to present a variety of different type of programs such as class schedule, conference schedule, or other suitable categorical programs mentioned above.

The system 700 supports the retrieval of programming information based on several different levels of details. The information is stored in the database 708 and can be retrieved by communication to the database 708. The database 708 includes several sectors, (e.g., sectors 710, 712, 714, and 716), wherein each of the sectors contain a particular level of content details for the programs. There may be more or less levels of details than as illustrated in FIG. 7. In one example, the sector 710 includes a first level of detail, which comprises basic information such as criteria: name, location (channel), and time of the programs. The sector 712 includes a next level of details, which comprises more detailed information such as programs' episode title, episode short summary, and episode full description. The sector 714 includes yet a next level of details which comprises even more detailed information (additional descriptive qualities) such as qualities, stereo, rerun, closed captions, and any accompanying website, etc . . . The sector 716 includes any other information needed to be added to the database 708. Individual programs or events within the database 708 are uniquely identifiable and the programming information for a specific program or event can be retrieved in a number of levels of detail. Each level of detail in the database 708 for a specific program or event may be a field within that database 708.

The server 702 hosts the address of a web page, which is can be accessed from and displayed on the user machine 704. The server 702 can connect to the user machine 704 through a conventional network service. A user can retrieve the programming information by interacting with a web browser for a web page 705 which can be run on the user machine 704. The user uses the machine 704 to communicate interactions from the user back to the server 702 as the user accesses and runs the web page 705. The server 702 then mediates communication between the user and the database 708 to obtain the necessary to present the programs fitting a request by the user.

The user machine 704 comprises an apparatus such as an instruction, an application routine or a set of source code 706 to present the categorical programs at different levels of details. The instruction can perform some or all of the embodiments described above to gather the appropriate information and present them to the user. One example of such an application routine is software implementing a detail-in-context technique well known in the art to display schedules of categorical programs having progressive levels of details.

Interactions by the user define the range and type of query, which is passed to the server 702, which formulates the actual query or calls a "stored procedure" on the database 708 to retrieve the desired information. The results of queries are formatted and returned to the client. One typical format is HTML format, which can be, used for the communication between the web page 705 and the server 702. In one example, no layout computation is performed on the server 702, which process information requests. The layout computation is performed on the user machine 704.

The user machine 704 supports processes that can perform the exemplary methods described above. The user machine 704 supports a layout process. In one example, the user machine 704 comprises an interpreted program script, which runs within a web browser for the web page 705. The script governs the layout of the programming information. The user machine 704 enables the user to control the selection of the range of categories and parameter such as times and locations for which to construct a display. When the user makes a selection, this selection is passed up to the server 702, which performs the query on the database 708 to return the briefest information about the programs or events within the defined or supplied parameters. The briefest information can be referred to as the first level of content details. This information is passed back to the user machine 704. The user machine 704 contains the application routine 706, which determines the appropriate initial layout (typically, in a tabular layout format) for this result The user machine 704 also supports an adjustment process. In one example, if the initial layout contains enough slack space to display more information then a request is sent to the server 702 and from there to the database 708 for additional levels of detailed information to add. This process is repeated until a best fit of the amount of information displayed to the available display space is reached. The user machine 704 further supports a resizing process. In one example, when the user indicates particular interest in a specific cell (a program or an event) in the schedule, the application routine 706 increases the display space for that cell by subtracting display space from other events according to the detail-in-context methods. The user then issues a request for, and receives from the sever 702 additional information to add to the cell of interest (it requests the next available level of detail). This process may repeat until all of the available information for an event is being displayed. As other cells are reduced in size, their displayed information is adjusted as necessary to appropriately fit the available space. This may mean that long fields of information are truncated (the truncation indicated by an ellipsis or some other means) or that shorter fields are dropped. Fields are removed in the reverse order to that in which they were added.

Figure 8:
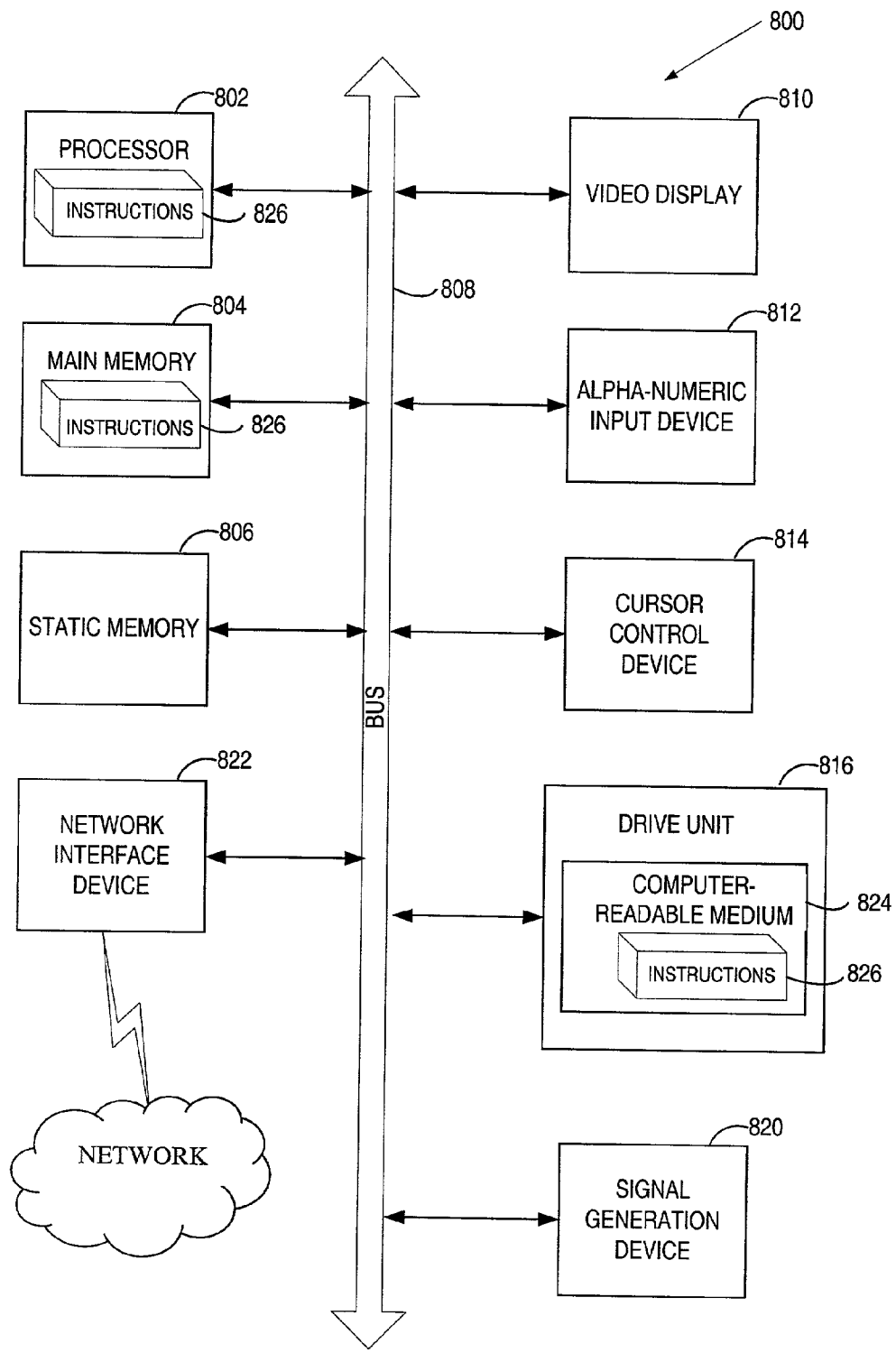
FIG. 8 illustrates a block diagram of an exemplary computer system 800 that may be used to perform one or more of the operations described herein.

FIG. 8 illustrates a block diagram of an exemplary computer system 800 that may be used to perform one or more of the operations described herein. In alternative embodiments, the machine may comprise a network server, a network gateway, a network router, a network switch, a network bridge, Personal Digital Assistant (PDA), a cellular telephone, a web appliance or any machine capable of executing a sequence of instructions that specify actions to be taken by that machine. The instructions may include instructions for performing any on e of or all of the methods described above.

The computer system 800 includes a processor 802, a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 820 (e.g., a speaker) and a network interface device 822.

The disk drive unit 816 includes a computer-readable medium 824 on which is stored a set of instructions (e.g., software, application routine, or codes) 826 embodying any one, or all, of the methodologies described above. The instruction 826 is also shown to reside, completely or at least partially, within the main memory 804 and/or within the processor 802. The instruction 826 may further be transmitted or received via the network interface device 822.

For the purposes of this discussion, the term "computer-readable medium" shall be taken to include any medium that is capable of storing or encoding a sequence of instructions for execution by the computer and that cause the computer to perform any one of the methodologies of the embodiments. The term "computer-readable medium" shall accordingly be taken to included, but not be limited to, solid-state memories, read only memories (ROMs) random access memories (RAMs) EPROMs, EEPROMs magnetic or optical cards, optical and magnetic disks, (e.g., floppy disks, CD-ROMS, DVD-ROMS) magnetic-optical disks, and carrier wave signals, or any type of media suitable for storing electronic instructions.

While the invention has been described in terms of several embodiments, those skilled in the art will recognize that the invention is not limited to the embodiments described but can be practiced with modification and alteration within the spirit and scope of the appended claims. The description is thus to be regarded as illustrative instead of limiting.

I claim:

1. A method comprising:
retrieving information for a plurality of programs fitting categories defined in a request;
generating a first tabular layout having a first total dimension, said first tabular layout comprising a first level of content details for each program of said plurality of programs, said each program occupying a space in said first tabular layout;

adjusting said first level of content details for at least one selected program to a second level of content details, said at least one selected program being selected by a user interaction with said first tabular layout;

resizing spaces occupied by said at least one selected program to accommodate said second level of content details and resizing spaces occupied by non-selected programs to generate a second tabular layout having a second total dimension that is similar to said first total dimension; and determining whether said resized spaces occupied by said non-selected programs in said second tabular layout can accommodate more content details than in said first level of content details while maintaining said second tabular layout having said second total dimension that is similar to sad first total dimension, and if so, then replacing said first level of content details for each said non-selected program with another level of content details having more content details such that the display of the another level of content details will not be truncated.

2. The method as in claim 1 wherein said second level of content details comprises content detail of more detailed information than said first level of content details or less detailed information than said first level of content details.

3. The method as in claim 1 wherein said adjusting said first level of content details for at least one selected program comprises:

receiving a user input which requests for more content details for said at least one selected program; and replacing said first level of content details with said second level of content details.

4. The method as in claim 1 further comprising:

if said resized spaces occupied by said non-selected programs in said second tabular layout are smaller than said spaces in said first tabular layout then removing sufficient information from said first level of content details from said non-selected programs to fit said resized spaces occupied by said non-selected programs.

5. The method as in claim 1 wherein said information comprises progressive levels of content details ranging from a high level detail to a low level detail wherein said high level detail includes the most detailed information and said low level details includes the least detailed information about said categorical programs.

6. The method as in claim 1 wherein said retrieving information for a plurality of programs fitting categories defined in a request further comprising:

receiving a user request for said plurality of programs; and sending a query to a database to retrieve said information.

7. The method as in claim 1 wherein said categorical programs are selected from a group consisting of television program schedules, conference schedules, class schedules, class catalogues, presentation schedules, festival schedules, movie schedules, advertisement schedules, advertisement listings, financial reports, sport program schedules, activity schedules, and publication schedules.

8. A system comprising:

a processor to:

retrieve information for a plurality of programs fitting defined categories;

generate a first tabular layout having a first total dimension, said first tabular layout comprising a first level of content details in a specified space for each program of said plurality of programs;

adjust said first level of content details for at least one selected program to a second level of content details;

resize spaces occupied by said at least one selected program to accommodate said second level of content details and to resize spaces occupied by non-selected programs to generate a second tabular layout having a second total dimension that is similar to said first total dimension; and determine whether said resized spaces occupied by said non-selected programs in said second tabular layout can accommodate more content details than in said first level of content details while maintaining said second tabular layout having said second total dimension that is similar to said first total dimension, and if so, then replacing said first level of content details for each said non-selected program with another level of content details having more content details such that the display of the another level of content details will not be truncated.

9. The system as in claim 8 wherein said adjust comprises:

receive a user input which requests for more detailed information for said at least one selected program; and replace said first level of content details with said second level of content details.

10. The system as in claim 8 wherein said system further comprises said processor to:

if said resized spaces occupied by said non-selected programs in said second tabular layout are smaller than said spaces in said first tabular layout, remove sufficient content details from said first level of content details from said non-selected programs to fit said resized spaces occupied by said non-selected programs.

11. A computer system comprising:

a computer system having a network card connectable to a network and a memory for storing a set of instruction wherein said set of instruction:

to retrieve information for a plurality of programs fitting defined categories;

to generate a first tabular layout having a first total dimension, said first tabular layout comprising a first level of content details in a specified space for each program belonging to said plurality of programs;

to adjust said first level of content details for at least one selected program of said plurality of programs a second level of content details; and to resize spaces occupied by said at least one selected program to accommodate said second level of content details and to resize spaces occupied by non-selected programs to generate a second tabular layout having a second total dimension that is similar to said first total dimension; and to determine whether said resized spaces occupied by said non-selected programs in said second tabular layout can accommodate more content details than in said first level of content details while maintaining said second tabular layout having said second total dimension that is similar to said first total dimension, and if so, then replacing said first level of content details for each said non-selected program with another level of content detail is having more content details such that the display of the another level of content details will not be truncated.

12. The computer system as in claim 11 wherein said computer system is connected to said network.

13. The computer system as in claim 11 wherein said computer system further comprises at least one a processor, said processor executes said set of instructions.

14. The computer system as in claim 11 wherein said computer system further comprises a memory for storing said set of instructions.

15. The computer system as in claim 11 wherein said set of instruction further comprises:
   to receive a user input which requests for more content details for said at least one selected program; and
   replacing said first level of content details with said second level of content details.

16. The computer system as in claim 11 wherein said set of instruction further comprises:
   if said resized spaces occupied by said non-selected programs in said second tabular layout are smaller than said spaces in said first tabular layout then to remove sufficient content details from said first level of content details from said non-selected programs to fit said resized spaces occupied by said non-selected programs.

* * * * *